United States Patent [19]
Cline et al.

[11] Patent Number: 5,926,637
[45] Date of Patent: Jul. 20, 1999

[54] SERVICE INTERFACE REPOSITORY CODE GENERATION DATA

[75] Inventors: Owen Richard Cline, Poway; B. Charles Eutsler, Escondido; My Tien Pare; Pamela Morgan Smurlo, both of San Diego, all of Calif.

[73] Assignee: BEA Systems, Inc., Sunnyvale, Calif.

[21] Appl. No.: 08/914,991

[22] Filed: Aug. 20, 1997

[51] Int. Cl.[6] .................................................. G06F 9/45
[52] U.S. Cl. ........................ 395/701; 707/103; 711/115
[58] Field of Search ........................ 395/200.33, 200.53, 395/671, 674, 682, 683, 701; 345/326, 335; 707/4, 10, 102, 103; 711/115

[56] References Cited

U.S. PATENT DOCUMENTS

| | | | |
|---|---|---|---|
| 4,819,160 | 4/1989 | Tanka et al. | 364/300 |
| 5,301,270 | 4/1994 | Steinberg et al. | 395/161 |
| 5,761,499 | 6/1998 | Sonderegger | 395/610 |
| 5,768,510 | 6/1998 | Gish | 395/200.33 |

*Primary Examiner*—Tariq R. Hafiz
*Assistant Examiner*—Antony Nguyen-Ba
*Attorney, Agent, or Firm*—Fliesler, Dubb, Meyer & Lovejoy, LLP

[57] ABSTRACT

A method, apparatus, and article of manufacture for generation of tools and applications for a computer network. An access server, executed by a first computer accesses interface definitions stored in a database. A data access library, coupled to the access server and executed by a second computer, provides the interface definitions to be stored in the database by the access server. A server, coupled to the data access library and executed by a third computer, sends requests to maintain and use stored interface definitions in the database. An set of code generation data, stored in the database, which allows developers to give hints to the programmer and/or the code generator for default values, validation specifications and GUI presentation hints for a given field.

19 Claims, 2 Drawing Sheets

SERVICE INTERFACE REPOSITORY CODE GENERATION DATA

CROSS-REFERENCE TO RELATED APPLICATIONS

This application is related to the following applications:

application Ser. No. 08,915,124, entitled "SERVICE INTERFACE REPOSITORY," filed on same date herewith, by Owen R. Cline et al., attorney Docket No. 7346;

application Ser. No. 08,915,434, entitled "SERVICE INTERFACE REPOSITORY INTERNATIONALIZATION," filed on same date herewith, by Owen R. Cline et al., attorney Docket No. 7351;

application Ser. No. 08,914,988, entitled "SERVICE INTERFACE REPOSITORY APPLICATION PROGRAMMING MODELS," filed on same date herewith, by Owen R. Cline et al., attorney Docket No. 7349;

application Ser. No. 08,904,406, entitled "SOFTWARE INTERFACE ADAPTER FOR USE WITH MULTIPLE DEVELOPMENT TOOLS," filed on Jul. 31, 1997, by Jack P. Dundon et al., attorney Docket No. 7348;

application Ser. No. 08,094,401, entitled "SOFTWARE INTERFACE FOR DYNAMIC MAPPING," filed on Jul. 31, 1997, by Jack P. Dundon et al., attorney Docket No. 7505;

all of which are incorporated by reference herein.

BACKGROUND OF THE INVENTION

1. Field of the Invention

This invention relates in general to computer networks, and in particular to a tool for application development for object based computer networks.

2. Description of Related Art

An important trend in the industry is the development of client/server architectures in distributed computing environments to support transaction processing applications. Currently, distributed computing environments typically comprise interconnected mainframes, minicomputers, servers and workstations. This integration of mainframes, minicomputers, servers and workstations into a distributive computing environment creates the need for tools capable of operating in this environment, especially tools that assist in development of applications for distributed computing environments.

SUMMARY OF THE INVENTION

The present invention discloses a method, apparatus, and article of manufacture for a tool that assists in the development of applications for object based computer networks. An access server, executed by a first computer accesses interface definitions stored in a database. A data access library, coupled to the access server and executed by a second computer, provides the interface definitions to be stored in the database by the access server. A server, coupled to the data access library and executed by a third computer, sends requests to maintain and use stored interface definitions in the database. A set of code generation data, stored in the database, which allows developers to give hints to the programmer and/or the code generator for default values, validation specifications and GUI presentation hints for a given field.

The access server, data access library, and server are executed on separate computers (first computer, second computer, and third computer, respectively, as discussed above). Alternatively, the first, second, and third computers may be the same computer.

An object of the present invention is to provide tools to aid in interfacing with computer networks. Yet another object of the present invention is to provide an improved method of storing information on the networks and the components executed by the nodes. Still another object of the present invention is to provide a method for customers and third party vendors to create their own tools and utilities.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
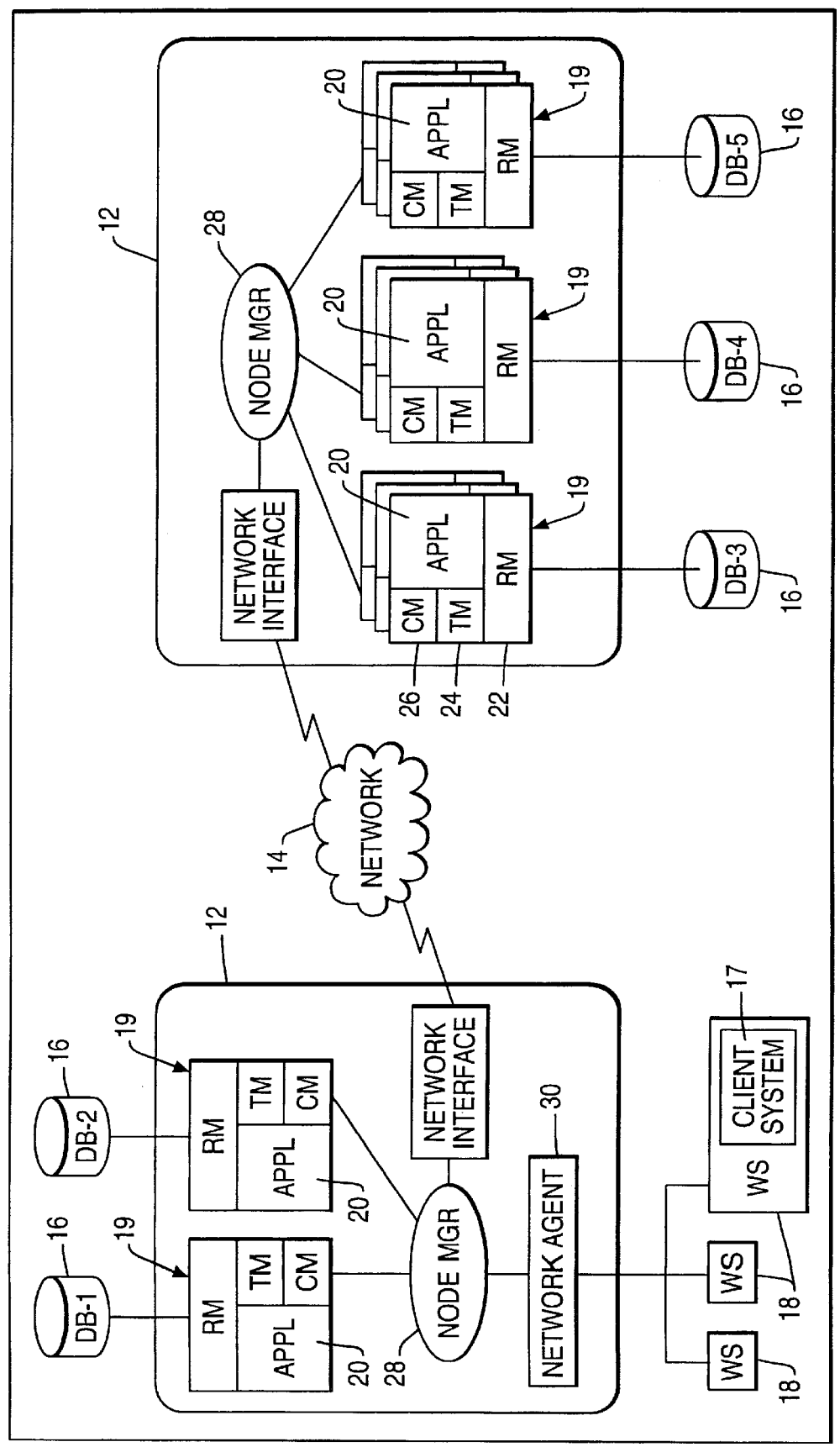
FIG. 1 is an exemplary illustration of a distributed computing environment known as a TOP END™ system.

FIG. 1 is an exemplary illustration of a distributed computing environment 10, known as a TOP END™ system. The present invention comprises a method, apparatus, and program product for facilitating the applications development in such distributed computing environments.

A TOP END™ system 10 is comprised of one or more nodes 12 interconnected by a network 14, wherein each of the nodes 12 is comprised of one or more computers. Each of the nodes 12 is typically coupled to one or more fixed and/or removable data storage units (DSUs) 16, such as disk drives, that store one or more databases.

In the exemplary environment of FIG. 1, a client-server architecture is disclosed. At least one of the nodes 12 provides the connection to client systems 17 operating on workstations 18. The client systems 17 can also be an application component 19 running inside the node 12. Operators of the TOP END™ system 10 use a workstation 18 or terminal to transmit electrical signals to and from server systems operating on the node 12 in the TOP END™ system 10, wherein the electrical signals represent commands for performing various services in the TOP END™ system 10, such as search and retrieval services against the databases. Those skilled in the art will recognize, however, that the present invention has application to any service or software that can be performed by a TOP END™ system 10.

According to the present invention, these services are divided into several modular components 19 that are designed for a distributed, message-passing computing environment. In TOP END™ terminology, a "component" 19 is a process or logical group of processes that performs one or more services. The components 19 work together to process distributed transactions initiated by the client systems 17.

Work is divided among the nodes 12 in the TOP END™ system 10 by spreading the location of these modular components across the nodes 12. Thus, each node 12 performs some localized service and work is managed by the TOP END™ system 10 so that a sequence of multiple services comprising a client system 17 request is performed by one or more of the modular components on one or more of the nodes 12 in the TOP END™ system 10.

The fundamental component in a TOP END™ system 10 is the application component 19. The application component 19 contains application code 20 that links with the libraries to create an application component 19. Application components 19 are used to create and grow distributed TOP END™ systems 10. The application components 19 could be user-written, provided as a solution by an independent vendor, or supplied as part of the TOP END™ system 10. In a TOP END™ system 10, libraries are available to an application component 19, including resource managers 22 such as database management systems (DBMS), transaction managers 24, and communications managers 26.

Another component of a TOP END™ system 10 is the node manager 28. The node manager 28 is a collection of processes that offer core services to coordinate processing among nodes 12. These processes, in general, work independently of each other. Services provided by the node manager 28 include transaction management (for example, commit coordination), logging, failure recovery, client/server request handling, security management, runtime administration, and application component 19 control.

Still another component of a TOP END™ system 10 is the network agent 30. Network agents 30 are used to allow transactions and service requests to enter a TOP END™ system 10 from an application component 19 or networked workstation 18 that does not have a node manager 28 on it.

Service Interface Repository Description

Figure 2:
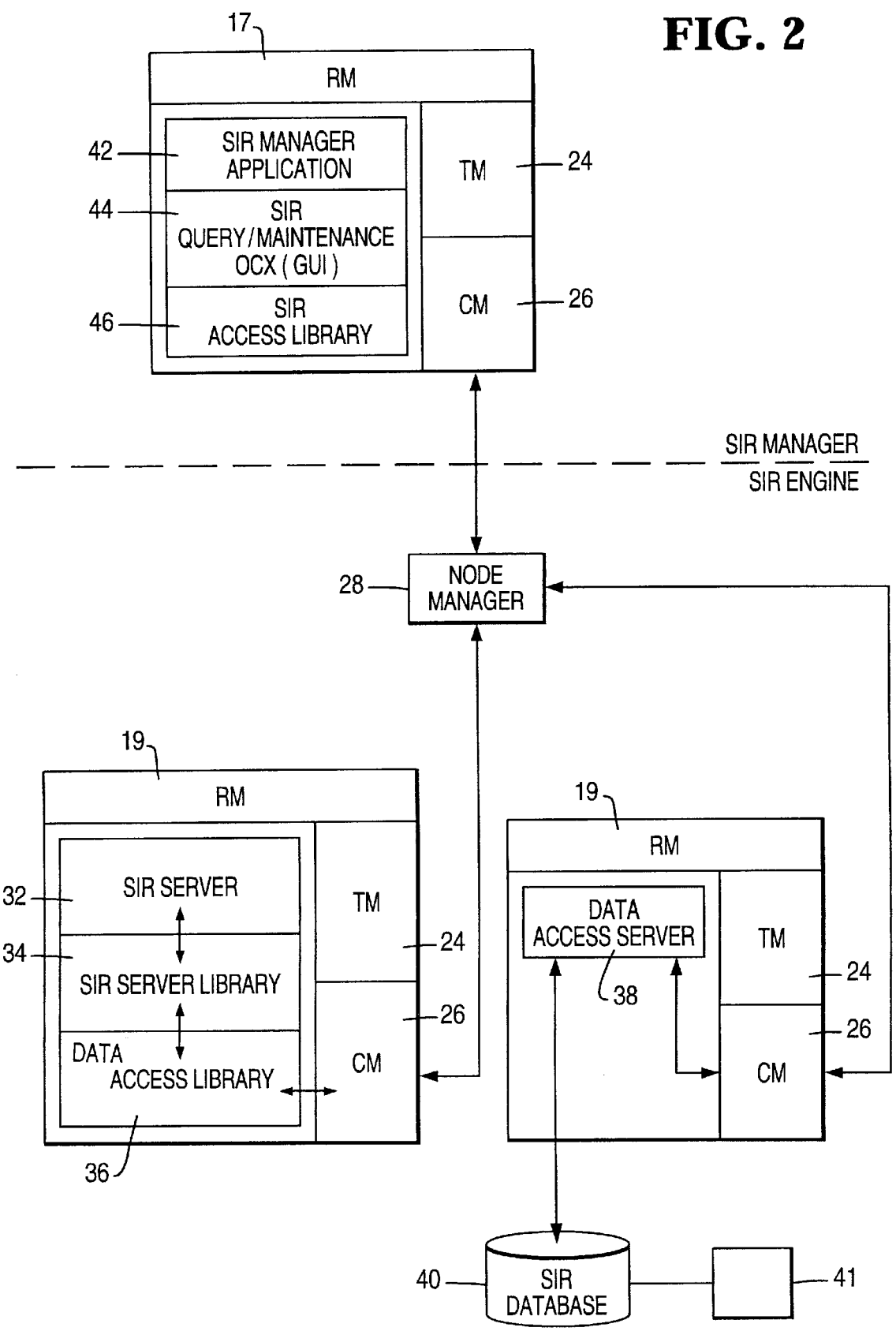
FIG. 2 illustrates the components of the present invention and their relationship to each other.

FIG. 2 illustrates the components of the present invention and their relationship to each other.

The Service Interface Repository (SIR) accelerates development of products, (i.e., combined client systems, application components, and resource managers) that work within the TOP END™ environment. The SIR allows users to store and retrieve the service interface definitions of these products. The definitions can then be used by tools that are integrated with the TOP END™ system 10, via the SIR, for generating code for these products. In addition to supporting code generators, a central repository also means that TOP END™ products and services can be more readily and easily used and reused in new product development. In terms of cost savings, a SIR means that code can be written faster, with fewer rewrites, and can be deployed into the field faster.

The SIR contains features that exceed the most basic information that is needed to generate code for TOP END™ products and services. These additional features include support for aggregate data types (structures, unions and tagged unions), user defined data types, code generation data (default values, validation specifications and Graphical User Interface (GUI) presentation hints), and support for runtime identification of repeating records, tagged unions and output buffers.

Every TOP END™ product is developed to provide one or more services. Each one of these services operates on client system 17 input data and responds to the client system 17 with output data. When requesting a service, a client system 17 needs to know the layout of the input data to send to the application component 19 and the layout of the output data it receives from the application component 19. The current method of developing client systems 17 is manual, such that the interfaces to services, such as the data layouts, are documented by the developer, and read by the client system 17 developer to manually generate client system 17 code. This manual generation of client system 17 code could be automated if the interfaces to services were defined and programmatically accessible.

Further, the simplification and generation features of the present invention can be applied to servers. For example, server definitions are placed into the SIR Database 40 and documentation, template server code, etc. would be generated.

The present invention is a collection of programs that store and retrieve TOP END™ service interface definitions. Definitions of services are stored in the SIR Database 40 either before or after any application using those definitions is written. The SIR can also be used to generate template applications. Since the present invention is not dependent on the actual running TOP END™ system 10, information can be stored in the present invention at any point in the development cycle.

A service interface definition is usually composed of a TOP END™ system 10, with at least one product, one or more services within each product, and the input data and output data for each service.

Input and output data is described using buffers. Multiple buffers indicating multiple protocols within each service are supported.

Buffers are made up of fields and each field has a type. Types can be one of the SIR base types, a user-defined typedef or an aggregate. In addition, code generation data can be specified for each field. Each field is also named such that code generators can use the names for variables and labels.

Further, buffers and aggregates (structures, unions, and tagged unions) can have fields with dynamic and static repetitions. The repetition field represents how many occurrences of the field are within the buffer or aggregate. For static repetitions, any positive non-zero constant integer value can be specified. Dynamic repetitions can either be end-of-buffer or a repeating record count. A repeating record count is a pointer to a preceding field that contains the count of the number of times that the field repeats. Repeating record count fields must precede the field and be of integer or ASCII numeric (precision 0) type. For aggregates, the end-of-buffer capabilities are not available.

As mentioned above, users are able to define their own data types. Users are able to define structures which allow a collection of fields (such as name and address) to be reused in the definitions of multiple services. Typedefs can be defined by tool integrators whose tools support data that can't be represented in terms of the SIR's predefined types. An example of this is the typical "datetime" data type which is supported by all commercial databases but whose internal representation is non-standard. By allowing user-defined typedefs, an "Oracle DateTime" data type can be defined. This data type is different than the "SQL Server DateTime" data type, which also may be defined.

Unions and tagged unions can also be defined. Tagged unions provide assistance to code generation programs because there is a defined variable for runtime identification of the union contents. The type of the tag is specified by the user and can be a 1, 2 or 4 byte binary field, or an ASCII numeric field of a length specified by the user.

Buffers, fields, aggregates and types are reusable objects which can be used in the definition of multiple objects.

The present invention also supports unrestricted categories (or groupings) of objects. Multiple levels of categories can be used to organize system/product/service groupings into a hierarchy. Multiple category paths to the same system/product/service grouping are allowed.

The present invention supports product development in a TOP END™ system 10 as well as third parties who wish to integrate their development tools with the TOP END™ system 10.

For example, a code generator is a type of tool integration. A code generator uses the present invention to display the available products and services and retrieve the definition of the TOP END™ products and services the user selects. The code generator uses the interface definition to generate a client system 17 application for that tool's development environment.

It is envisioned that the present invention can be used by tool vendors who are performing an integration with TOP END™ via the SIR, and by developers who are using the integrated tool (developed by the tool vendor) to create an actual client system 17. The developer can then deploy their client system 17. Further, a customer can integrate the SIR into a custom development environment, or create utilities that generate files that are read in and customized by existing development environments. The simplification and generation features of the present invention can also be applied to servers within the distributed processing system. For example, server definitions are placed into the SIR Database 40 and documentation, template server code, etc. would be generated.

Detailed Description of the Service Interface Repository

The SIR is a collection of programs and libraries for maintaining and accessing a repository of service interface definitions. These programs and libraries can be broken into two groups: the SIR Manager and the SIR Engine.

As shown in FIG. 2, the SIR Engine is comprised of the SIR Server 32, the SIR Server Library 34, the Data Access Library 36, the Data Access Server 38, and the SIR Database 40. The SIR Manager is comprised of the SIR Manager Application 42, the SIR Query/Maintenance Object Linking and Embedding (OLE) Control Library (OCX) 44, and the SIR Access Library 46. The SIR Manager components are typically resident on a client system 17. The SIR Manager and the SIR Engine are described in more detail in United States patent application entitled "SERVICE INTERFACE REPOSITORY," filed on same date herewith, by Owen R. Cline et al., attorney docket No. 7346, which is incorporated by reference herein.

Detailed Description of the Code Generation Data

The present invention uses the collection of programs (the SIR) that store and retrieve TOP END service interface definitions to facilitate the automatic generation of code by generators. Since the present invention is not dependent on the actual running TOP END system 10, information can be stored in the present invention at any point in the development cycle to allow for other tools to generate code.

The objects in the SIR database that support basic code generation for service interfaces are systems, products, buffers, fields, typedefs and aggregates (structures, unions and tagged unions). Using this information things such as the packing and unpacking of buffers, calls to send a request to a server, calls to return a response to a client, variable names, procedure names, data structures such as typedefs and records (structures, unions and tagged unions), and even GUI labels can be automatically generated.

The message protocol for each service is defined in the SIR as a buffer. Buffers are made up of fields and each field has a type. Types may be one of the SIR base types, a user-defined type or an aggregate which is also made up of fields. The present invention extends this basic code generation support by allowing a user to define additional code generation data 41 associated with each field stored in the SIR database. This information includes default values, validation specification and GUI presentation hints on a per field basis.

Default values can be specified for both text and scalar fields. A code generator can use the default value to either set a variable which will in turn be used to create a buffer or to set a field on a GUI.

The validation specification would be used to restrict the values allowed for a particular field. Validation specifications can be specified for both text and scalar fields. For scalar fields this entry would include a list of the range(s) of numbers that are valid for the field. For example, an integer field may only range from 50 to 100. The validation specification for text fields contain strings that describe valid values for the field. Validation specifications can be exercised on both user entered data from a GUI or on arguments passed in to generated procedures.

A presentation hint specifies the type of graphical representation for a field. This presentation hint would be used by a code generator when building the forms to use in a GUI application. Using presentation hints, a field can be marked to display as a certain kind of control or to not be visualized as a GUI control at all. Control types supported in the SIR include NEVER_DISPLAY, IGNORE_FIELD, RADIO_BUTTON, CHECKBOX, SINGLE_LINE_EDIT_BOX, SINGLE_LINE_TEXT_BOX, MULTI_LINE_EDIT_BOX, MULTI_LINE_TEXT_BOX, EDITABLE_DROP_DOWN_LIST_BOX, NON_EDITABLE_DROP_DOWN_LIST_BOX, AND LIST_BOX. These control types are supported in most Windows and Unix environments and are descriptive of the types of graphical displays for input and output data. The control type NEVER_DISPLAY indicates to the code generator that no graphical element should be generated but that the value should be retrieved from the output buffer and stored in a variable. In addition, the control type IGNORE_FIELD indicates that this field need no be graphically display or have its value stored. In this case the field is padding to account for alignment of data between the client and the server.

Further, manual programming can be applied to all aspects of the code generation covered above. Although automatic code generation is quicker, the same code generation data 41 can be manually applied by a programmer since the interface is predefined.

TABLE 1

| Database Objects | Description |
| --- | --- |
| Hierarchical Categories | Any number of category levels can be used to organize system/product/service groupings into a hierarchy. Multiple category paths to the same system/product/service grouping will be allowed. |
| TOP END ™ Systems | One or more TOP END ™ systems can be created from the root node. System names must be unique and adhere to TOP END ™ naming conventions. |
| TOP END ™ Products | One or more TOP END ™ products can be created in a system. Product names must be unique within a system and adhere to TOP END ™ naming conventions. |
| TOP END ™ Service Definitions (TOP END ™ Services) | A server developer can define buffers for a system/product/service grouping. Service names must be unique within a product and adhere to TOP END ™ naming conventions. The TOP END ™ Service is defined to conform to a specified Application Programming Model (APM). The models are:<br>• One Input/One Output Buffer<br>This model will be used by TOP END ™ Services that have one input buffer and one output buffer. If the user does not define an input buffer, the service takes no input. If the user does not define an output buffer, the |

TABLE 1-continued

| Database Objects | Description |
|---|---|
| | service produces no output.<br>• Multiple Input/Multiple Output Buffers (uses Format name)<br>This model is used when the service can accept different input and/or return different output buffers. The client sets the input_format structure with the format name to identify which buffer is being sent. The service sets the output_format structure with the format name to identify which buffer is being returned.<br>• Multiple Input/Multiple Output Buffers (uses tag)<br>This model is used when the service can accept different input and/or return different output buffers. The client prefixes its buffer with the number which identifies which buffer is being sent. The service prefixes its buffer with the number which identifies which buffer is being returned. (This is not defined as an actual field in the buffer).<br>• Single Input/Output Buffer<br>This model specifies one buffer for both input and output for the service. The buffer contains fields that are input to the service, output from the service and fields that are both input and output. One field can be identified as being the return value for the service.<br>• Free Form<br>This model allows users to define as many input buffers and output buffers as they want. There is no mechanism for identifying which buffer is being used. This model provides limited support to users of the SIR who are doing code generation since there is no identification of buffers at runtime.<br>The purpose of APMs is to provide an indicator to code generators to uniquely identify the buffers used to communicate with TOP END ™ services. This benefit applies to all APMs with the exception of Free Form. |
| Buffer Descriptions | A server developer can group any number of fields into a buffer description. Buffer descriptions support the ability to handle repeating fields. Repeating fields can be specified at development time or detected at runtime. The number and types of buffers defined for a service are specified by its APM. |
| Field Descriptions | Buffers and aggregates are made up of fields. The type of these fields may be one of the provided basic types or a user defined abstract data type. |
| Abstract Data Types | A server developer can define three types of abstract data types (ADT) to be used to type fields. They are: typedefs, structures and unions (including tagged unions). For both structures and unions, nesting is allowed. Regarding unions, tagged unions give information to code generators that let them identify which information is in the union at runtime. Untagged unions do not contain information that would allow code generators to generate code that automatically determines the contents of the union. |
| Default Value Specifications | A server developer can specify a default value for a field description. Separate tables are used for text and scalar field descriptions. A default value would be used to assign an initial value and/or mandate that a value be entered for a particular field. |
| Presentation Hints | A server developer can specify a presentation hint for a field description. These will be used by a code generation program when building the forms to use in a GUI application. They could specify that a Boolean value should be shown as a radio button instead of a checkbox. Other available controls are: single-line edit boxes, single-line text boxes, multi-line edit boxes, multi-line text boxes, list boxes, editable drop-down lists and noneditable drop-down lists. In addition, there is a value that says the field should not be displayed (but its value stored where it can be used or set) and a value that says the field should be ignored. |
| Validation Specifications | A server developer can specify a validation specification for a field description. A validation specification would be used to restrict the values allowed in a particular field description. For example, an integer field could only range from 50 to 100. Separate tables are used for text and scalar fields. The validation specification for text fields contain strings that describe valid values for the field. The validation specification for scalar fields contain a list of ranges of numbers that are valid for the field. |

TABLE 2

| Type | Description |
|---|---|
| SIR_CHAR_T | Single-byte character data |
| SIR_WCHAR_T | Multi-byte character data (2 bytes) |
| SIR_INT8_T | one-byte signed integer |
| SIR_UINT8_T | one-byte unsigned integer |
| SIR_INT16_T | Two-byte signed integer |
| SIR_UINT16_T | Two-byte unsigned integer |
| SIR_INT32_T | Four-byte signed integer |
| SIR_UINT32_T | Four-byte unsigned integer |
| SIR_INT64_T | Eight-byte signed integer |
| SIR_UINT64_T | Eight-byte unsigned integer |
| SIR_FLOAT_T | Four bytes, internal format is application specific |
| SIR_DOUBLE_T | Eight bytes, internal format is application specific |
| SIR_ASCII_NUMERIC_T | Numeric information that has been converted to an ASCII string |
| SIR_BYTE_T | Byte array (1 to n bytes) |

Conclusion

In summary, the present invention discloses a method, apparatus, and article of manufacture for a tool that assists in the development of applications for object-based computer networks. An access server, executed by a first computer accesses interface definitions stored in a database. A data access library, coupled to the access server and executed by a second computer, provides the interface definitions to be stored in the database by the access server. A server, coupled to the data access library and executed by a third computer, sends requests to maintain and use stored interface definitions in the database. An set of code generation data, stored in the database, which allows developers to give hints to the programmer and/or the code generator for default values, validation specifications and GUI presentation hints for a given field.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A program tool for a distributed processing system, comprising:

an access server, executed by a first computer, for assessing interface definitions stored in a database; a data access library, coupled to the access server and executed by a second computer, for providing the interface definitions to be accessed in the database by the access server;

a server, coupled to the data access library and executed by a third computer, for sending requests to the data base through the access server, wherein the requests maintain and use the interface definitions; and a set of code generation data, stored in the database, for providing information to assist in creating code based on the interface definitions;

wherein the set of code generation data comprises a validation specification.

2. The programming tool of claim 1, wherein the first computer, the second computer, and the third computer are the same computer.

3. The programing tool of claim 1, wherein the set of code generation data includes a default value.

4. The programming tool of claim 1, wherein the set of code generation data includes a presentation hint.

5. The programming tool of claim 1, wherein said validation specification restricts values for specific fields and is specified for text fields via strings that describe valid values for a field, and scalar fields via a range of valid numbers.

6. The programming tool according to claim 5, wherein said validation specification is configured to be utilized on both user entered data from a GUI, and arguments passed in to generated procedures.

7. The programming tool of claim 1, wherein said validation specification is configured to be utilized on both user entered data from a GUI, and arguments passed in to generated procedures.

8. The programming tool according to claim 1, wherein said interface definitions target a TOP END™ or related system.

9. The programming tool according to claim 1, wherein said interface definitions include at least one of input and output data defined as buffers.

10. The programming tool according to claim 9, wherein said buffers are one of a base type provided by said programming tool, user defined types, and aggregates.

11. The programming tool according to claim 10, wherein said user defined types include types matching types defined by other systems.

12. The programming tool according to claim 11, wherein said user defined types matching types defined by other systems include at least one of "SQL Server DateTime" and "Oracle DateTime."

13. The programming tool according to claim 9, wherein said buffers have fields with at least one of static and dynamic repetitions.

14. The programming tool according to claim 10, wherein said aggregates include at least one of structures, unions, and tagged unions.

15. The programming tool according to claim 10, wherein said interface definitions target a TOP END™ or related system.

16. A method for storing and accessing definitions of interfaces for an object-oriented computer network, comprising the steps of:

accessing interface definitions stored in a database;

developing the interface definitions to be stored in the database by specifying a set of code generation data; and sending requests to the database wherein the requests maintain and use the developed interface definitions;

wherein the set of code generation data comprises a validation specification.

17. The method according to claim 16, wherein said step of accessing, comprises:

accessing interface definitions that target a TOP END™ or related system.

18. A program storage device, readable by a computer, tangibly embodying at least one instruction executable by the computer to perform a method for storing definitions of interfaces for an object-oriented computer network, the method comprising the steps of:

accessing interface definitions stored in a database;

developing the interface definitions to be stored in the database by specifying a set of code generation data; and sending requests to the database wherein the requests maintain and use the developed interface definitions;

wherein the set of code generation data comprises a validation specification.

19. The program storage device according to claim 18, wherein the method step of accessing, comprises:

accessing interface definitions that target a TOP END™ or related system.

* * * * *